UNITED STATES PATENT OFFICE.

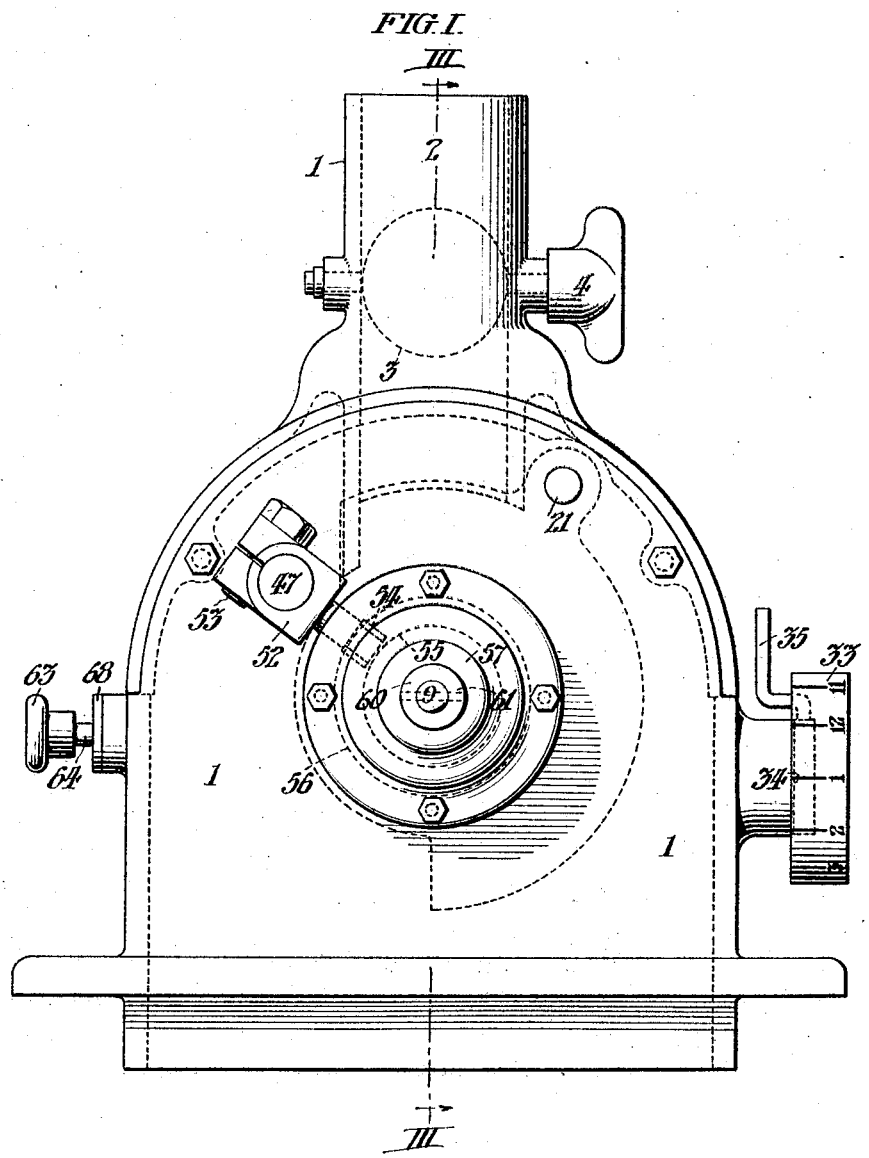

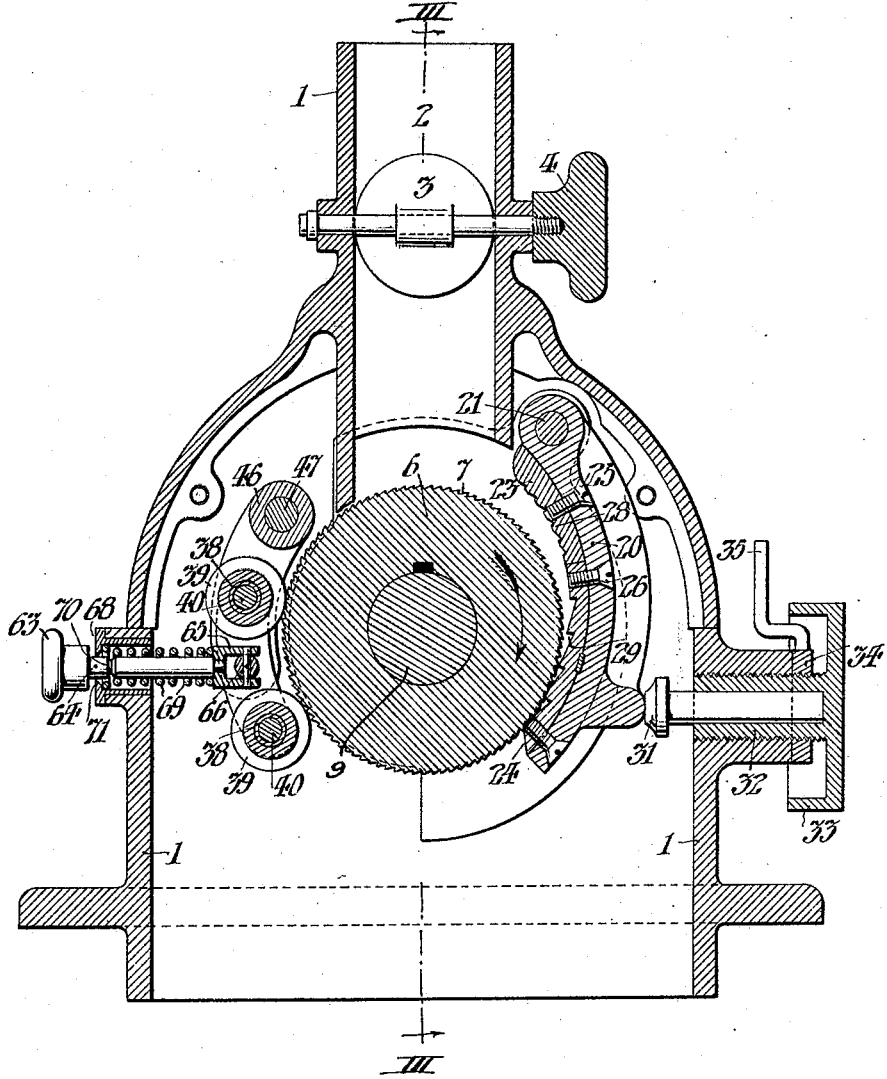

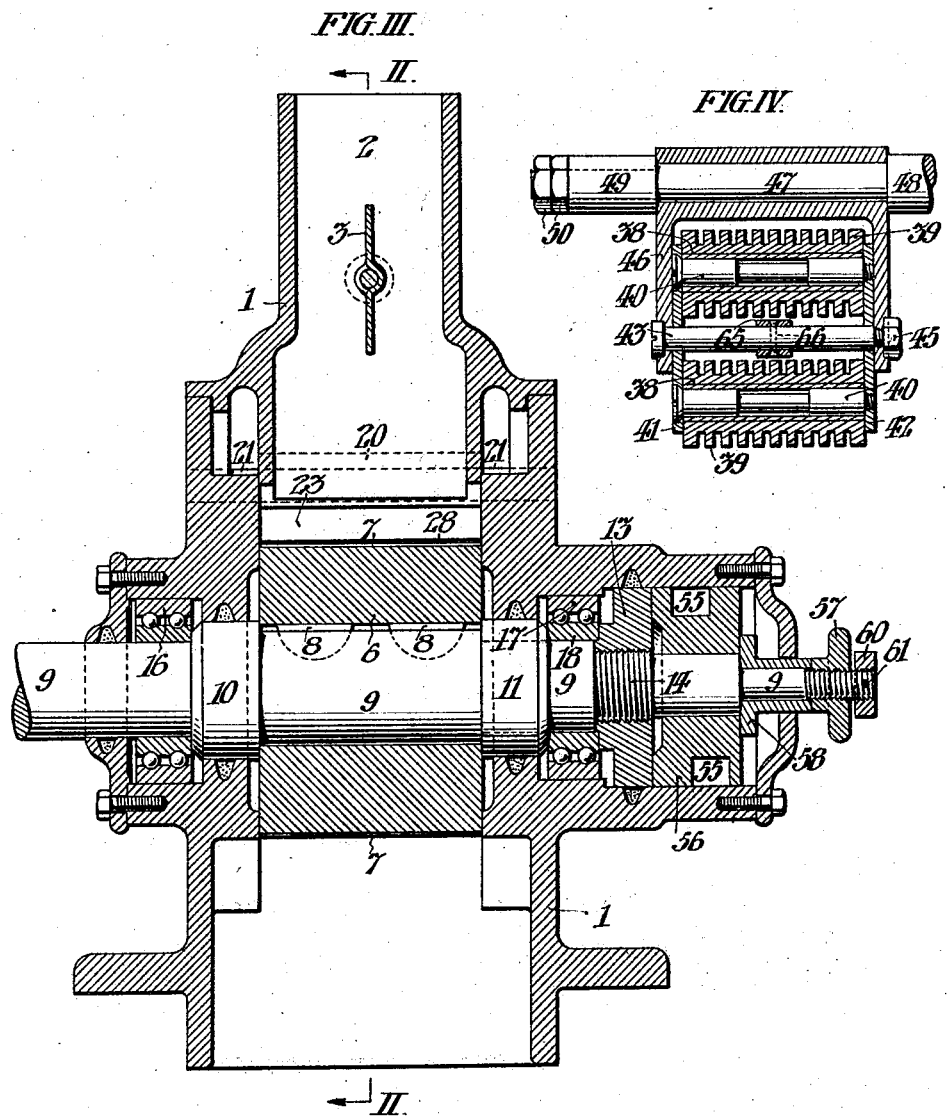

WILLIAM SOMMERS AND LOUIS FRITZ, OF PHILADELPHIA, PENNSYLVANIA.

COFFEE MILL.

1,420,877.  Specification of Letters Patent.  Patented June 27, 1922.

Application filed April 30, 1917. Serial No. 165,313.

*To all whom it may concern:*

Be it known that we, WILLIAM SOMMERS and LOUIS FRITZ, both citizens of the United States, residing at Philadelphia, in the State of Pennsylvania, have invented a certain new and useful Improvement in Coffee Mills, whereof the following is a specification, reference being had to the accompanying drawings.

Our invention relates to grinding mills of the general class shown in Letters Patent 1,011,603 granted to us December 12, 1911; wherein a milling cutter having teeth on its circumference, which are ridges extending parallel with its axis, is opposed by a pivoted milling plate which is a lever adjustable toward and away from the toothed surface of said cutter to vary the degree of comminution of the grist; and a roller is provided to engage the teeth of said cutter and move axially with respect thereto to clean said teeth. Our present invention includes improvements in the construction and arrangement of said milling plate; the means for adjusting it; and the construction and arrangement of the cleaning roller or rollers.

Our invention comprises the various novel features of construction and arrangement hereinafter more definitely specified and claimed.

In the drawing: Fig. I is a front elevation of a grinding mill conveniently embodying our improvement.

Fig. II is a central vertical sectional view of said mill, taken on the line II, II, in Fig. III, in the direction of the arrows marked thereon.

Fig. III is a vertical sectional view taken on the line III, III, in Figs. I and II in the direction of the arrows marked thereon.

Fig. IV is a vertical, partly sectional, view of the cleaning rollers and their supporting mechanism indicated in Fig. II.

In said figures; the casing 1 has the upper opening 2 for the grist, controlled by the disk valve 3 which may be rotated by the handle 4. The metallic cylindrical milling cutter 6 is rotatable upon a horizontal axis in said casing 1 and has teeth 7 which are ridges on its periphery parallel with its axis. Said cutter is connected by the keys 8 to turn with the driving shaft 9, on which it is rigidly secured between the stationary collar 10 and movable clamp collar 11; the latter being movable axially, to clamp said cutter between said collars, by the nut 13 which engages the screw thread 14 on said shaft. Said shaft is mounted to rotate in the ball bearings 16 and 17, and the inner race member 18 of the latter is movable axially on said shaft 9 to permit the aforesaid clamping action of said nut 13.

Said milling cutter 6 is opposed by the milling plate 20 which is the width of, and pendent opposite to, the toothed face of said cutter, from an immovable axis, parallel with but above the axis of said cutter; said plate being hung upon the shaft 21 so that its lower free end may be adjusted toward and away from said cutter. Said milling plate 20 is conveniently provided with two removable shoes 23 and 24, which are respectively adjustably connected therewith by the screws 25 and 26 and have teeth 28 and 29 on their faces extending toward and parallel with the teeth 7 on said cutter. It is to be noted that, as shown in Fig. II, the upper shoe teeth 28 are closer together and finer than the lower shoe teeth 29. Moreover, as the teeth 7 on the cutter 6 point in the direction of rotation of the latter, and said teeth 28, on the upper shoe 23, point in the opposite direction; a rotary movement is imparted to the grains of coffee as they are drawn downwardly between said teeth so that particles thereof are cut from the exterior of the coffee grains without crushing the latter and the milling action is more rapid than if said teeth were not thus opposed in direction. We find it advantageous to dispose the teeth upon the cutter and upon said shoes parallel with each other because such relation insures that the material to be ground shall neither be concentrated at the center of the cutter nor at the ends thereof (as in structures of the prior art) but shall be evenly distributed throughout the length of the cutter to insure the continual effective use of the full length of the cutter, and consequent rapidity of the milling operation. As indicated in Fig. II, the adjustable means arranged to shift the free end of said plate 20 toward and away from said cutter 6 includes the pin 31 which is loosely mounted in the screw 32, which is in threaded engagement with said casing 1 and has the hollow milled head 33 by which it may be turned to axially shift said pin. Said screw 32 is provided wtih the jam nut 34 extending within the hollow head 33 of said screw but having the lever handle 35 extending exterior thereto whereby it may be conveniently turned.

It is to be noted that the operation of the mill above described causes its parts to vibrate to such a degree that the screw 32 would be automatically shifted outwardly, if it were not provided with means to jam it in adjusted position. It is advantageous to provide the jam nut 34 for said screw, within the hollow head 33 of the latter, to prevent it from being accidentally loosened, as it might be if it were exposed exterior to said head.

The teeth 7 of said milling cutter 6 are apt to become clogged with the comminuted coffee, so as to vary the comminution of the latter, without the will of the operator, unless means are provided to keep the teeth clean when the mechanism is set to finely grind or pulverize the grist. Therefore, we provide the pair of cylindrical metallic cleaning rollers 38 which are journaled in said casing 1 with their axes parallel with said cutter 6 when in the operative position shown in Fig. II, and each has a face 39 of hard rubber, vulcanized fiber, or other suitable non-metallic material adapted to be indented by said cutter teeth 7 so as to mesh therewith and be rotated by said cutter. As shown in Figs. II and IV, said cleaning rollers 38 are journaled on shafts 40 which are coupled by the yoke plates 41 and 42, with which latter they are rigidly connected, by their screw threaded ends shown in Fig. IV; so as to form a carriage for said rollers. Said yoke plates 41 and 42 are mounted to oscillate on the shaft 43 which is held stationary, by the nut 45, in the carriage hanger 46, which is, however, free to oscillate upon the shaft 47 between the shoulder 48 and collar 49 thereon, the latter being rigidly connected with said shaft 47 by the lock nuts 50. As shown in Fig. I, said shaft 47 has at its outer end the arm 52 which is clamped thereon by the screw 53 and carries at its free end the roller 54 which is adapted to engage the groove 55 of the cam 56. Said cam may be rigidly connected with said shaft, so as to be rotated by the latter, by means of the nut 57, shown in Fig. III, which bears upon the outer end of the washer sleeve 58, the inner end of which bears upon the outer face of said cam 56 and holds said cam in frictional engagement with said nut 13. However, when said nut 57 is unscrewed, said cam is released from such frictional engagement and remains stationary while the shaft 9 rotates in it. The nut 60 which is secured upon the end of said shaft 9 by the pin 61 is merely to prevent accidental loss of said nut 57.

When said cleaning rollers and their driving mechanism above described are in the position shown in the drawings; rotation of said shaft 9, which is incident to the operation of said cutter 6, also turns said cam 56 and causes the cleaner shaft 47 to reciprocate axially in accordance with the serpentine configuration of the groove 55 in said cam. However, as it is unnecessary to operate said cleaning mechanism except when the milling plate 20 is set to effect fine grinding of the grist; we find it convenient to provide said carriage with means adjustable to present said cleaning rollers 38 in engagement with said cutter teeth 7, and withhold them from such engagement. As shown in Fig. II, such means includes the handle 63 connected by the rod 64 with the clevis 65, which is pivotally connected by the pin 66 with said shaft 43, which is stationary in the carriage hanger as shown in Fig. IV. As shown in Fig. II, said rod 64 extends freely through the bushing 68 in said casing 1, and is provided with the spring 69 which bears at its outer end in said bushing and at its inner end upon said clevis so as to normally press said rollers 38 with their indentable faces 39 in engagement with the cutter teeth 7; the pivotal connection of said bar 64 with said shaft 43, by said pin 66, above described, being such as to permit reciprocation of the carriage and corresponding lateral oscillation of said rod 64 in said socket 68. However, when it is desired to retract and withhold said cleaning rollers from engagement with said milling cutter; said handle 63 may be withdrawn until the groove 70 in said rod is engaged with the flange 71 of said bushing, by depressing said handle. Of course, when said handle is again raised to permit said rod 64 to move freely through said bushing 68; said spring 69 returns the carriage to the operative position shown in Fig. II.

However, it is to be understood that we do not desire to limit ourselves to the specific construction and arrangement of said cam 56 above described, whereby it may be rendered operative or inoperative, as said cam may be otherwise connected with said shaft 9. For instance, it may be permanently connected therewith by a set screw or other suitable means. Moreover, it is to be understood that we do not desire to limit ourselves to the specific details of construction and arrangement of the means, above described, by which said carriage is adjusted to present said rollers 38 in engagement with said cutter teeth and to withhold them from such engagement, as any suitable means may be employed.

Of course, said opening 2 at the upper end of said casing 1 may be connected with a hopper or other source of supply of the coffee or other grist to be ground in said mill and which is upheld by the valve 3 when the latter is turned to horizontal position. When, however, said valve is turned to vertical position, as shown, the coffee or other material is then allowed to gravitate upon the upper toothed surface of said cutter 6, and, as said cutter is turned in the direction of the arrow on Fig. II, said material is caught by the teeth 7 and forced downwardly into the wedge shaped space between the circumference of said cutter and the adjacent toothed face of the milling plate 20. The upwardly inclined teeth 28 on the upper shoe 23 of said plate 20 catch the grains of coffee, or other material, so that they are rolled by the action of said cutter and coarsely granulated preliminary to their further comminution between the teeth 7 of said cutter and the downwardly inclined teeth 29 of the lower shoe 24. In the position shown in Fig. II; said milling plate 20 is so set and held by the pin 31 that the ground product is pulverized. However if coarser grinding is desired; the jam nut 34 is loosened by movement of its lever handle 35; the milled head 33 of the screw 32 is turned to retract the latter to the desired extent; and the jam nut 34 then returned to its original position to prevent accidental displacement of said screw 32. It is to be understood that said screw head 33 may be graduated upon its circumference, as indicated in Fig. I, so that the operator may precisely adjust the same to a predetermined degree, corresponding with the desired comminution of the product.

It may be observed that said casing 1 includes the base in which said milling roller 6 is journaled and a cover in which said milling plate 20 is journaled, independently of said casing base; said two parts being accurately fitted together by means including the vertical flanges forming the side walls of the grist passageway 2 as shown in Fig. III, and extending into said base; and horizontal flanges fitting upon the top of said base. Said two parts are rigidly but detachably connected, conveniently by four cap screws, the outer hexagonal heads of two of which are indicated in Fig. I, and the inner ends of the other two of which are indicated in Fig. II. Such construction and arrangement are advantageous in that access to said roller 6 and the other parts within the casing is readily afforded by removal of said cover, carrying with it said milling plate, without disturbance of the means whereby the relative adjustment of said milling roller 6 and milling plate 20 has been effected; such adjusting means, including the screw 32, being mounted in said casing base, independently of said casing cover.

We do not desire to limit ourselves to the precise details of construction and arrangement herein set forth, as it is obvious that various modifications may be made therein without departing from the essential features of our invention as defined in the appended claims.

We claim:

1. In a grinding mill, the combination with a casing; of a milling plate; and means arranged to move said plate, including a screw in threaded engagement with said casing, and having a hollow head; a jam nut for said screw within said head; and a pin, loosely mounted in said screw, in engagement with said plate.

2. In a grinding mill, the combination with a casing; of a milling plate; and means arranged to move said plate, including a screw in threaded engagement with said casing, and having a hollow head; a jam nut for said screw within said head; and means, carried by said screw, engaging said plate.

3. In a grinding mill, the combination with a casing; of a milling plate; and means arranged to move said plate, including a screw having a hollow head; a jam nut for said screw within said head; and means, carried by said screw, relatively rotatable with respect thereto, and engaging said plate.

4. In a grinding mill, the combination with a casing; of a milling plate; and means arranged to move said plate, including a screw in threaded engagement with said casing; a pin loosely mounted in said screw, in engagement with said plate; whereby said pin may be shifted axially, to move said plate, by turning said screw, without turning said pin; index means carried by said screw, arranged to manifest upon the exterior of said casing, the position of said pin and milling plate within said casing; and means, independent of said plate, arranged to secure said pin in axially adjusted position.

5. In a grinding mill, the combination with a casing; of a milling plate; and means arranged to move said plate and thereby predetermine the degree of comminution of the grist, including a hollow screw in threaded engagement with said casing and having a hollow head; index means, including graduations upon the exterior of said hollow head, whereby the position of adjustment of said plate is indicated; a jam nut for said screw within said head; means extending exterior to said head, arranged to operate said jam nut; and a pin, loosely mounted in said screw, in engagement with said plate.

6. In a grinding mill, the combination with a casing, including a base and a removable cover; of a milling roller journaled in said casing base; a milling plate journaled in said casing cover; and means in said casing base whereby said milling plate may be adjustably moved, upon its journal in said cover, with respect to said roller;

whereby said milling plate is removable and replaceable with said cover to afford access to said roller, without disturbing said roller and the means for determining the relative position of said roller and plate.

7. In a grinding mill, the combination with a casing, including a base and a removable cover; of journals in said base for a milling roller; journals in said cover for a milling plate; means forming a passageway in said cover for the grist, including vertical flanges extending into said base; and horizontal flanges on said cover bearing upon said base.

In testimony whereof, we have hereunto signed our names at Philadelphia, Pennsylvania, this 23rd day of April, 1917.

WILLIAM SOMMERS.
LOUIS FRITZ.

Witnesses:
JAMES H. W. ALTHOUSE,
ED BURY.